United States Patent
Harmsze et al.

(10) Patent No.: US 7,483,314 B2
(45) Date of Patent: Jan. 27, 2009

(54) INTEGRATED CIRCUIT WITH DYNAMIC MEMORY ALLOCATION

(75) Inventors: Françoise Jeannette Harmsze, Eindhoven (NL); Artur Tadeusz Burchard, Eindhoven (NL); Harm Jan Hiltjo Nanno Kenter, Eindhoven (NL)

(73) Assignee: NXP B.V., Eindhoven (NL)

( * ) Notice: Subject to any disclaimer, the term of this patent is extended or adjusted under 35 U.S.C. 154(b) by 122 days.

(21) Appl. No.: 10/565,814

(22) PCT Filed: Jul. 16, 2004

(86) PCT No.: PCT/IB2004/051241

§ 371 (c)(1),
(2), (4) Date: Jan. 24, 2006

(87) PCT Pub. No.: WO2005/010759

PCT Pub. Date: Feb. 3, 2005

(65) Prior Publication Data

US 2007/0064500 A1 Mar. 22, 2007

(30) Foreign Application Priority Data

Jul. 28, 2003 (EP) .................................. 03102312

(51) Int. Cl.
*G11C 7/10* (2006.01)
*G06F 12/00* (2006.01)

(52) U.S. Cl. .................................. 365/189.05; 711/163
(58) Field of Classification Search ............ 365/189.05; 711/163
See application file for complete search history.

(56) References Cited

U.S. PATENT DOCUMENTS

2005/0055406 A1* 3/2005 Singhai et al. .............. 709/206

OTHER PUBLICATIONS

Chang et al. (Performance Analysis and Architecture Evaluation of MPEG-4 Video Codec System; IEEE 2000).*

* cited by examiner

*Primary Examiner*—Hyung S Sough
*Assistant Examiner*—Mardochee Chery

(57) ABSTRACT

An integrated circuit comprising a plurality of modules (M) for processing applications is provided, wherein each of said modules comprise a local memory (LM). The integrated circuit further comprises a global memory (GM), which can be shared between the plurality of modules (M), and an interconnect means (IM) for interconnecting said modules (M) and said global memory (GM). A memory managing unit (MMU) is associated to each of said modules (M) and determines whether the local memory (LM) provides sufficient memory space for the currently processed application. If this is not the case, the memory managing unit (MMU) requests a global buffer (FB) in said global memory (GM) to be exclusively reserved for the processing data of its associated module (M). Accordingly, by using the local memory (LM), whenever possible, before data is outsourced to the global memory (GM), power as well as bandwidth of the interconnect means can be saved. Furthermore, sufficient flexibility is introduced to the system on-chip to enable running applications that demand more local resources e.g. local memory, than are available in the subsystems or modules (M), without having the need to design the subsystems or modules for worst case scenarios. Especially, when the worst-case demands are much higher than the average case, the cost advantage can be significant.

11 Claims, 1 Drawing Sheet

INTEGRATED CIRCUIT WITH DYNAMIC MEMORY ALLOCATION

FIELD OF THE INVENTION

The invention relates to an integrated circuit comprising a plurality of modules and a method for memory allocation in such an integrated circuit.

BACKGROUND OF THE INVENTION

With the recent development of computation and communication resources two main trends in the architecture of mobile terminals have risen. The first trend is the application convergence and increasing diversity, e.g. more and more diverse functions or subsystems are integrated into a single terminal enabling the terminal to perform new services and applications. The second trend is directed to the aggravation of architecture complexity, e.g. the overall complexity of both hardware and software architectures exceeds the limits of conventional architectures style based on cores connected by buses.

One possible solution to meet for the above mentioned trends appears to be modularity. When the boundaries of modules are chosen to coincide with functional subsystems like GSM modems, displays or audio, two levels of hardware and software architecting can be derived. The first one is the intra-subsystem architecture where the conventional architecture style based on cores connected by buses can be applied whereby existing subsystems can be re-used. The second level of architecting is the inter-subsystem architecture, where a network architecture can be applied, with the inter-subsystem communication being performed on an OSI-like layered network architecture. With these two levels of architecting the development of functional subsystems can be performed as already known in the art, and therefore intellectual property (IP)-Blocks can be re-used.

Typically, most mobile terminals provide their function on the bases of a few peripheral components, like a portable audio player (an audio subsystem and a CD or solid-state storage), a mobile phone (GSM modem and speech codec), a palm-top organizer (touch screen+microprocessor) or a solid-state camera (camera+display+solid-state storage). The variety of these different subsystems, e.g. peripheral components, increases steadily. These different subsystems evolve independently of each other and rapidly become more advanced and more complex, so that their performance parameters, like bit rates, capacity, resolution and quality steadily improve. The actual terminals contain more and more subsystems and the internals of the subsystems become less important since the emphasis is moved towards software, applications and services.

While the traditional architecting based on cores and buses have been focussing on computations over a limited set of computation resources, scheduling tasks over a small set of tightly coupled blocks having low latencies, and tight bus protocols, the architecting between subsystems focuses no longer on computation but on communication. The resources shared by the different subsystems is the communication infrastructure and possibly a shared memory. These subsystems are usually loosely coupled with relatively high latencies and relatively low synchronisation rates as well as network protocols.

A terminal usually consists of a plurality of subsystems which are connected to each other via a network. Subsystems like UMTS modems or video codec can be designed independently. They may contain one or more programmable cores, some coprocessors, local memories and I/O. The network is used to connect the subsystems. All inter-subsystem communication, like data, instructions, memory traffic and control information will be performed via the network.

A so called Systems-on-Chip SoC typical comprise a plurality of subsystems e.g. functional elements or modules with local memory, which are connected by an interconnect scheme. This System-on-Chip SoC are adapted to perform different applications which can be mapped onto the set of subsystems. All functions performed by the subsystems require a certain amount of memory for performing their processing. The exact amount of memory will depend on a plurality of parameters like the screen size for video decoding, the data rate for modems or the like. Accordingly, different applications will have different demands for memory. Nowadays most application domains in the area of consumer electronics require that the system cost as well as the power consumption is minimized. To be competitive in the above mentioned constraint environment it is essential that the required amount of memory (both on-chip or external) is optimised for the specific application. On the other hand, with the above described trend of convergence of many consumer electronics markets like mobile phones, PDAs, MP3 player or the like, it is not feasible any more to look at a single specific application or merely a limited set of applications. Any realization of the terminal must be low-cost and low-power, where the costs are substantially defined by the bill of material, namely the chip area, the chip count, pin counts and PCB wiring layers. One important aspect for these terminals is the allocation of sufficient memory so that the applications can be performed as required.

SUMMARY OF THE INVENTION

It is therefore an object of the invention to provide an integrated circuit with a plurality of modules being connected by an interconnect scheme with an optimised memory allocation.

This object is solved by an integrated circuit according to claim 1 and a method for memory allocation according to claim 8.

Therefore, an integrated circuit comprising a plurality of modules M for processing applications is provided, wherein each of said modules comprise a local memory LM. The integrated circuit further comprises a global memory GM, which can be shared between the plurality of modules M, and an interconnect means IM for interconnecting said modules M and said global memory GM. A memory managing unit MMU is associated to each of said modules M and determines whether the local memory LM provides sufficient memory space for the currently processed application. If this is not the case, the memory managing unit MMU requests a global buffer FB in said global memory GM to be exclusively reserved for the processing data of its associated module M.

Accordingly, by using the local memory LM, whenever possible, before data is outsourced to the global memory GM, power as well as bandwidth of the interconnect means can be saved. Furthermore, sufficient flexibility is introduced to the system on-chip to enable running applications that demand more local resources, e.g. local memory, than are available in the subsystems or modules M, without having the need to design the subsystems or modules for worst case scenarios. Especially, when the worst-case demands are much higher than the average case, the cost advantage can be significant.

According to an aspect of the invention, the memory managing unit MMU requests a communication path between the module M and said global memory GM to be reserved exclusively for this communication. In particular, the communication path is requested with the required properties for an uninterrupted access to the memory. Therefore, a communication path is guaranteed between the module and the global memory.

According to a further aspect of the invention, said integrated circuit further comprises a resource managing unit RMU. The resource managing unit RMU allocates memory space for said global buffer FB in said global memory GM according to the request of said memory managing unit MMU. Therefore, sufficient memory space is reserved exclusively for the processing data of the module being associated to the memory managing unit MMU.

According to still a further aspect of the invention, the resource managing unit RMU sets a communication path between the module M and the global memory GM according to the request from the memory managing unit. Accordingly, sufficient bandwidth is provided for the communication between the module M and the global memory GM.

According to a preferred aspect of the invention, the integrated circuit further comprises an address translation means ATM being associated to each of the modules for performing an address translation for data of an application performed on said module, which are stored in said global buffer FB in said global memory GM. Therefore, the outsourcing of the data which can not be stored in the local memory is not visible to the processing of the module.

According to still a further aspect of the invention, the resource managing unit RMU is furthermore adapted to perform the access arbitration of the global memory GM. The provision of the access arbitration enables the delivery of data within the required guarantees.

According to a further aspect of the invention, said local memory LM comprises a prefetch butter PB for prefetching data from the global buffer FB in said global memory GM. Accordingly, the latency which was introduced by outsourcing the processing data to the global memory, is hidden from the application.

The invention also relates to a method for memory allocation in an integrated circuit comprising a plurality of modules for processing applications, wherein each module comprises a local memory LM. The integrated circuit further comprises a global memory to be shared between said plurality of modules. A memory management determines whether sufficient space for processing data of an application run on a module is available in the local memory. If this is not the case, a buffer in said global memory is requested for an exclusive use for processing data of the application run on the module.

The invention is based on the idea, that, whenever a subsystem or a module has insufficient local memory due to a function or application having a certain set of parameters, a buffer will be allocated in a shared memory and furthermore communication paths with sufficient bandwidth will be set, in order to enable the data traveling to and from the shared memory.

The invention will now be described in detail with reference to the figure.

PREFERRED EMBODIMENTS OF THE INVENTION

Figure 1:
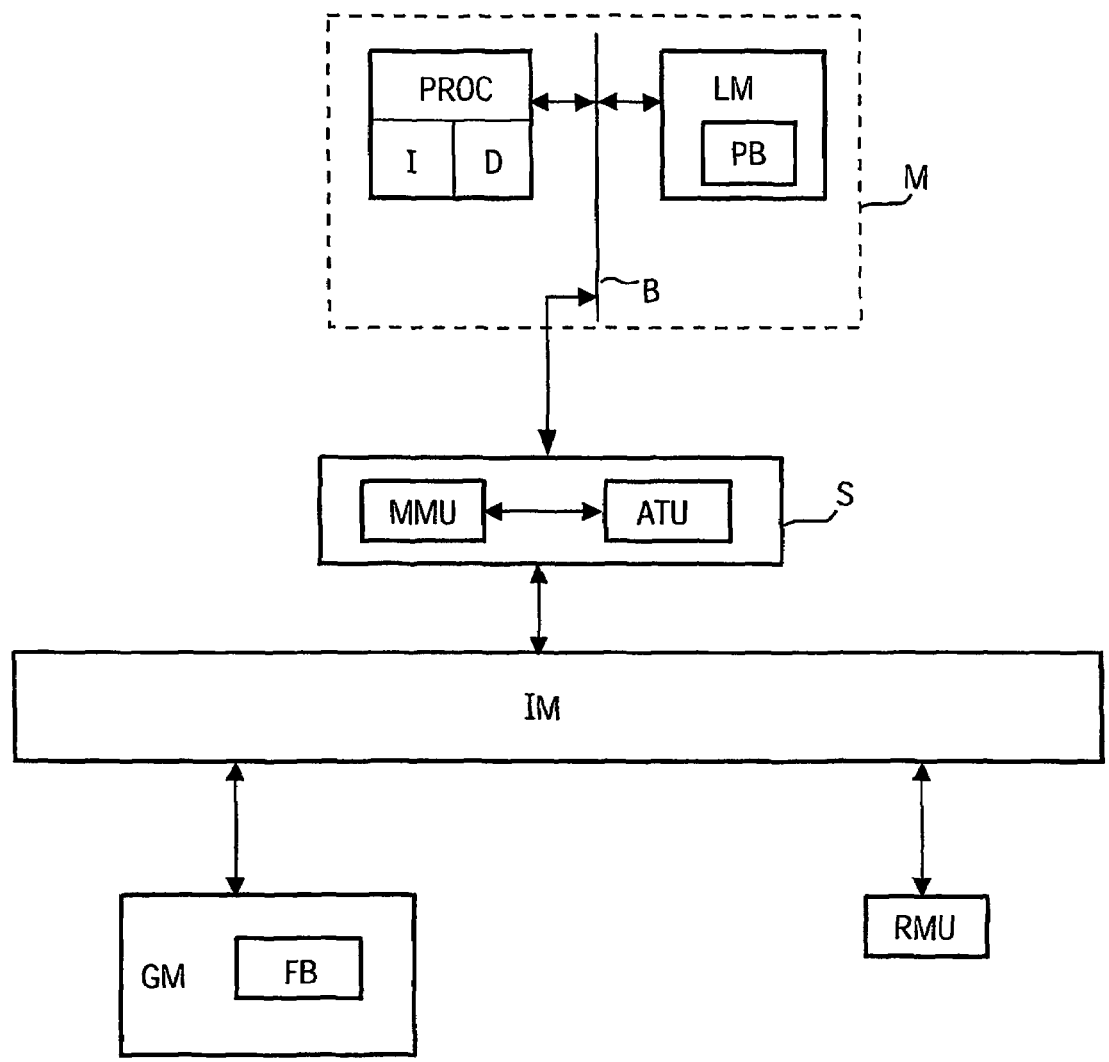
FIG. 1 shows a block diagram of a system on-chip according to the first embodiment.

The System on Chip according to the invention may be low on resources, i.e. a system for low cost and low power like a mobile phone or a portable device. However, the principles of the invention may also be applied to less constrained environments.

FIG. 1 shows a block diagram of a system or chip according to a first embodiment. The system comprises a module M, a shell S, an interconnect means IM, a global memory GM and a resource managing unit RMU. The module M is connected to the global memory GM via the shell S and the interconnect means IM. The module M comprises a processor PROC, an instruction cache I, a data cache D, and a local memory LM. The processor PROC and the local memory LM are connected to each other via a bus B. The local memory LM comprises a prefetch buffer PB. The local memory LM is used as a private memory exclusively for the module M. The local memory LM is dimensioned as a small memory which is enough to run applications with low memory demands. The amount of this memory space may depend on the application performed on the module M.

The module M may be any subsystem and may further comprise other functional blocks, performing dedicated applications or several different applications. Although the modules M have been described comprising a processor PROC, an instruction cache I, a data cache D, and a local memory LM, the modules may also be embodied without caches, without a regular processor but with at least one small dedicated processing unit.

The shell S is provided between the module M and the interconnect scheme IM and is used to manage the communication between the module and the interconnect scheme. The idea of the shell S is to hide the properties of the interconnect scheme to the module. Accordingly, already existing modules can be used without having to re-design their communication, since the shell S is used as an interface. The interconnect scheme IM is preferably a network on a chip but may also be a bus-based scheme. The network may also dynamically assign the path through this network based on for example latency. Such an interconnect IM can also, for example, offer communication channels with different parameters like bandwidth, delay, decoupling (by means of buffer in global memory). The appropriate channels, i.e. channel with appropriate parameters, for a certain type of communication with certain parameters may be chosen dynamically.

The shell S comprises a memory managing unit MMU and an addressed translation unit ATU. The memory managing unit MMU monitors the free memory space in the local memory LM and requests the allocation of a global buffer FB in the global memory GM as soon as the available memory space in the local memory LM is lower than a predetermined minimum value. The idea behind this is to outsource processing data from the application being run on the module M, for which there is not enough space in the local memory. The addressed translation unit ATU is then provided to translate the address used by the application run on the module M into addresses of the global address map corresponding to the global memory GM.

As mentioned above the memory managing unit MMU sends a request for a buffer in the global memory GM which should be reserved exclusively for the processing data from this module. This requests from the memory managing unit MMU is send to the resource managing unit RMU. The resource managing unit RMU is provided to manage the overall resources in the system. Additionally, the memory managing unit MMU requests for the provision of a guaranteed data path between the module M and the global memory GM via the interconnect scheme IM. The resource managing unit RMU receives these requests and determines whether there is enough space available in the global memory GM to reserve a buffer of the requested size as well as whether the interconnect scheme IM can provide enough bandwidth for the requested communication path between the module M and the global memory GM. If the resource managing unit RMU has determined, that there is enough space available in the global memory GM and that there is enough communication resources available for the communication path, the resource managing unit RMU sends a response to the memory managing unit MMU. The resource managing unit RMU includes the available space of the global buffer FB in the global memory GM as well as the address thereof into the response. As soon as the memory managing unit MMU has received this positive response from the resource managing unit RMU, it can activate the address translation unit ATU. The address translation unit ATU is used to hide the outsourcing of the processing data from the application run on the module M. In order to perform this hiding, the addresses of the processing data which can not be stored any more in the local memory LM are provided with an offset. The offset of the address of those processing data, which can not be stored in the local memory LM, is calculated based on the address of the global buffer FB in the global memory GM as returned by the resource managing unit RMU.

To achieve an additional improvement of the performance of this system, data stored in the global buffer FB can be prefetched before they are being used by the application run on the module M and stored in the prefetch buffer PB in the local memory LM. By prefetching this data the longer path of the global buffer FB in the global memory GM is hidden from the application and the latency introduced by outsourcing the processing data can also be hidden from the application.

The allocation of the global buffer FB in the global memory GM can be performed at run-time of a certain application or may as well be performed after a predetermined period of time or alternatively, it may be performed based on certain events as described above.

If on-chip as well as off-chip global memory is present in the system, the allocation of a buffer in the global memory will be done such as to optimised the cost, the power and the bandwidth resources.

The drawbacks of the dynamic memory allocation according to the invention is that additional complexity is added to the interface or shell of the modules M by introducing an address translation unit ATU. Furthermore, the resource managing unit RMU needs to be incorporated into the system on-chip, in order to keep track of the available communication resources. The exporting or outsourcing of a data will introduce additional latency. Moreover, the resource managing unit RMU needs to perform an access arbitration at the global memory, so that the required communication paths can be guaranteed.

According to a second embodiment of the invention, the module M from FIG. 1 may be an UMTS modem, which requires memory to perform a de-interleaving function. The amount of required memory for this function will depend on the data rate, the interleaving span (the amount of ms interleaving) and the coding rate of the error correction. If the memory is dimensioned for the maximum data rate and the maximum span, a memory of 2 Mbits is required. Usually, such a large amount of data have to be located in the global memory GM. On the other hand, if a low-demanding case at low data rate and minimum interleaving span is considered, merely 50kbits are required. This amount of memory space can easily be stored in the local memory LM, therefore, this will lead to a power advantage, since no data needs to be outsourced. Thus, reducing the power needed by a mobile phone is always preferable, since this is a prime competing factor ("talk-time") of a mobile phone.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. An integrated circuit comprising:
   a plurality of modules (M) for processing applications, each having a local memory (LM);
   a global memory (GM), which can be shared by said plurality of modules (M);
   interconnected data communications paths for interconnecting said modules (M) and said global memory (GM); and
   a memory managing unit (MMU) being associated with each of said modules (M), for determining whether said local memory (LM) provides sufficient memory space for processing a currently processed application on one of the plurality of modules (M) and for in response to the determining that there is not sufficient memory space, issuing a reservation request for memory space within a global buffer (FB) in said global memory (GM) to be exclusively reserved for processing data of the one of the plurality of modules and for in response to the determining that there is not sufficient memory space, issuing a path request for a dedicated communication path between the one of the plurality of modules and the global buffer.

2. The integrated circuit according to claim 1, wherein said communication path having communication properties according to the path request.

3. The integrated circuit according to claim 1, further comprising a resource managing unit (RMU) for allocating memory space in said global memory (GM) according to the reservation request of said memory managing unit (MMU).

4. The integrated circuit according to claim 3, wherein said resource managing unit (RMU) is adapted for setting a communication path based on communication properties as requested by said memory managing unit (MMU).

5. The integrated circuit according to claim 4, further comprising an address translation unit (ATU) associated with each of said modules (M) for performing an address translation for data of an application, which data are stored in said global buffer (FB) in said global memory (GM).

6. The integrated circuit according to claim 3, wherein said resource managing unit (RMU) is adapted to perform an access arbitration for said global memory (GM).

7. The integrated circuit of claim 3, wherein the RMU allocates memory space in said global memory in response to determining that there is adequate space in the global memory to support the reservation request and in response to determining that there is adequate transmission bandwidth to support the path request.

8. The integrated circuit of claim 3, wherein the RMU provides an address of the global buffer to the MMU and wherein the MMU uses the provided address to perform address translation between an address provided by the one of the plurality of modules to the address of the global buffer.

9. The integrated circuit according to claim 1, wherein said local memory (LM) comprises a prefetch buffer (PB) for prefetching data from said global buffer (FB).

10. The integrated circuit of claim 1, wherein the MMU determines whether the LM provides sufficient memory space for the currently processed application by comparing the memory space in the LM to a predetermined value.

11. A method for memory allocation in an integrated circuit comprising a plurality of modules (M) for processing applications, wherein each module comprises a local memory (LM), a global memory (GM) being adapted to be shared between said plurality of modules (M), the method comprising:
   determining whether said local memory (LM) provides sufficient memory space for processing a currently processed application of the one of the plurality of modules;
   in response to the determining that there is not sufficient memory space, issuing a reservation request for memory space within a global buffer (FB) in said global memory (GM) to be exclusively reserved for processing data of the one of the plurality of modules and in response to the determining that there is not sufficient memory space, issuing a path request for a dedicated communication path between the one of the plurality of modules and the global buffer.

* * * * *